US010728741B2

(12) United States Patent
Ukil et al.

(10) Patent No.: US 10,728,741 B2
(45) Date of Patent: Jul. 28, 2020

(54) DYNAMIC UE-CATEGORY SWITCHING FOR ENHANCED IDLE MODE POWER SAVINGS

(71) Applicant: QUALCOMM Incorporated, San Diego, CA (US)

(72) Inventors: Aritra Ukil, Hyderabad (IN); Amit Mandil, Hyderabad (IN); Raghu Hanumantha Gowda, Bengaluru (IN)

(73) Assignee: QUACOMM Incorporated, San Diego, CA (US)

( * ) Notice: Subject to any disclaimer, the term of this patent is extended or adjusted under 35 U.S.C. 154(b) by 0 days.

(21) Appl. No.: 15/417,485

(22) Filed: Jan. 27, 2017

(65) Prior Publication Data
US 2018/0220294 A1 Aug. 2, 2018

(51) Int. Cl.
*H04W 8/22* (2009.01)
*H04W 76/10* (2018.01)
*H04W 52/02* (2009.01)

(52) U.S. Cl.
CPC ......... *H04W 8/22* (2013.01); *H04W 52/0206* (2013.01); *H04W 52/0216* (2013.01);
(Continued)

(58) Field of Classification Search
CPC ..... H04W 8/183; H04W 48/18; H04W 36/30; H04W 36/18; H04W 36/12; H04W 36/04;
(Continued)

(56) References Cited

U.S. PATENT DOCUMENTS

| 2012/0302241 A1* | 11/2012 | Klingenbrunn | ....... H04W 48/16 455/436 |
| 2013/0217394 A1* | 8/2013 | Kim | ...................... H04B 7/195 455/436 |

(Continued)

FOREIGN PATENT DOCUMENTS

| WO | WO-2016167616 A1 | 10/2016 |
| WO | WO-2016182532 A1 | 11/2016 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 14)" 3GPP Standard; 3GPP TS 36.331, 3rd Generation Partnership Project (3GPP), Mobile Competence Centre; 650, Route Des Lucioles; F-06921 Sophia-Antipolis Cedex; France, vol. RAN WG2, No. V14.1.0, Jan. 12, 2017 (Jan. 12, 2017), XP051230537, [retrieved on Jan. 12, 2017], 652 pages. Relevant pp. 39, 40, 459, 519.
International Search Report and Written Opinion—PCT/US2018/014818—ISA/EPO—dated May 8, 2018.

*Primary Examiner* — Dai Phuong

(57) ABSTRACT

Certain aspects of the present disclosure relate to methods and apparatus for dynamic UE-Category switching for enhanced idle mode power savings. A method for wireless communications by a user equipment (UE) is provided. The method generally includes, determining that a cell supports a second UE category, lower than a first UE category; and while in an idle mode: operating in the cell according to the first UE category; and taking action to operate in the cell according to the second UE category based on the determination.

16 Claims, 11 Drawing Sheets

(52) U.S. Cl.
CPC ....... *H04W 52/0258* (2013.01); *H04W 76/10* (2018.02); *Y02D 70/00* (2018.01); *Y02D 70/10* (2018.01); *Y02D 70/12* (2018.01); *Y02D 70/1242* (2018.01); *Y02D 70/1262* (2018.01); *Y02D 70/1264* (2018.01); *Y02D 70/142* (2018.01); *Y02D 70/164* (2018.01); *Y02D 70/21* (2018.01); *Y02D 70/22* (2018.01); *Y02D 70/24* (2018.01); *Y02D 70/26* (2018.01)

(58) Field of Classification Search
CPC ..... H04W 16/32; H04W 24/00; H04W 28/04; H04W 72/082; H04W 4/02; H04W 64/00; H04L 29/08657
USPC ..... 455/432.1–453, 456.1–456.3, 41.1–41.2, 455/513; 370/329–334
See application file for complete search history.

(56) References Cited

U.S. PATENT DOCUMENTS

| | | | |
|---|---|---|---|
| 2015/0011231 A1* | 1/2015 | Ekici | H04W 48/18 455/452.1 |
| 2015/0245236 A1 | 8/2015 | Lu et al. | |
| 2015/0327159 A1* | 11/2015 | Gude | H04W 48/18 455/434 |
| 2016/0205628 A1 | 7/2016 | Konno | |
| 2016/0262130 A1* | 9/2016 | Johansson | H04L 41/0672 |
| 2016/0345294 A1 | 11/2016 | Bennett et al. | |
| 2017/0142204 A1 | 5/2017 | Kodaypak et al. | |
| 2018/0054770 A1* | 2/2018 | Askerup | H04W 76/34 |

* cited by examiner

DYNAMIC UE-CATEGORY SWITCHING FOR ENHANCED IDLE MODE POWER SAVINGS

BACKGROUND

Field of the Disclosure

The present disclosure relates generally to communication systems, and more particularly, to methods and apparatus for dynamic UE-Category switching for enhanced idle mode power savings.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by Third Generation Partnership Project (3GPP).

A wireless communication network may include a number of base stations (BS) that can support communication for a number of user equipments (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, access point (AP), radio head, TRP (transmit receive point, transmission reception point, etc.), new radio (NR) BS, 5G NB, etc.

These multiple access technologies have been adopted in various telecommunication standards to provide a common protocol that enables different wireless devices to communicate on a municipal, national, regional, and even global level. New radio (NR), which may also be referred to as 5G, is a set of enhancements to the LTE mobile standard promulgated by Third Generation Partnership Project (3GPP). It is designed to better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in LTE, NR, and 5G technologies. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Aspects of the present disclosure relate to methods and apparatus for dynamic UE-Category switching for enhanced idle mode power savings.

Certain aspects of the present disclosure provide a method for wireless communications by a user equipment (UE). The method generally includes determining that a cell supports a second UE category, lower than a first UE category; and while in an idle mode: operating in the cell according to the first UE category; and taking action to operate in the cell according to the second UE category.

Certain aspects of the present disclosure provide an apparatus for wireless communications by a UE. The apparatus generally includes means for determining that a cell supports a second UE category, lower than a first UE category; means for, while in an idle mode, operating in the cell according to the first UE category; and means for, while in the idle mode, taking action to operate in the cell according to the second UE category.

Certain aspects of the present disclosure provide an apparatus for wireless communications by a UE. The apparatus generally includes at least one processor and a memory coupled to the at least one processor. The at least one processor is generally configured to determine that a cell supports a second UE category, lower than a first UE category; and while in an idle mode: operate in the cell according to the first UE category; and take action to operate in the cell according to the second UE category.

Certain aspects of the present disclosure provide a computer readable medium having computer executable code stored thereon for wireless communications by a UE. The computer executable code generally includes code for determining that the cell supports a second UE category, lower than a first UE category; code for, while in an idle mode, operating in the cell according to the first UE category; and code for, while in the idle mode, taking action to operate in the cell according to the second UE category.

Certain aspects of the present disclosure provide a method for wireless communications by a base station (BS). The method generally includes broadcasting information indicating that the BS supports a second UE category, lower than a first UE category; and receiving combined registration information registering a UE as the first UE category and the second UE category.

Certain aspects of the present disclosure provide an apparatus for wireless communications by a BS. The apparatus generally includes means for broadcasting information indicating that the BS supports a second UE category, lower than a first UE category; and means for receiving combined registration information registering a UE as the first UE category and the second UE category.

Certain aspects of the present disclosure provide an apparatus for wireless communications by a BS. The apparatus generally includes at least one processor and a memory coupled to the at least one processor. The at least one processor is generally configured to broadcast information indicating that the BS supports a second UE category, lower than a first UE category; and receive combined registration information registering the UE as the first UE category and the second UE category.

Certain aspects of the present disclosure provide a computer readable medium having computer executable code stored thereon for wireless communications by a BS. The computer executable code generally includes code for broadcasting information indicating that the BS supports a second UE category, lower than a first UE category; and code for receiving combined registration information registering the UE as the first UE category and the second UE category.

Other aspects, features, and aspects of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects of the invention disclosure herein. In similar fashion, while exemplary aspects may be discussed below as device, system, or method aspects it should be understood that such exemplary aspects can be implemented in various devices, systems, methods, and computer readable media.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
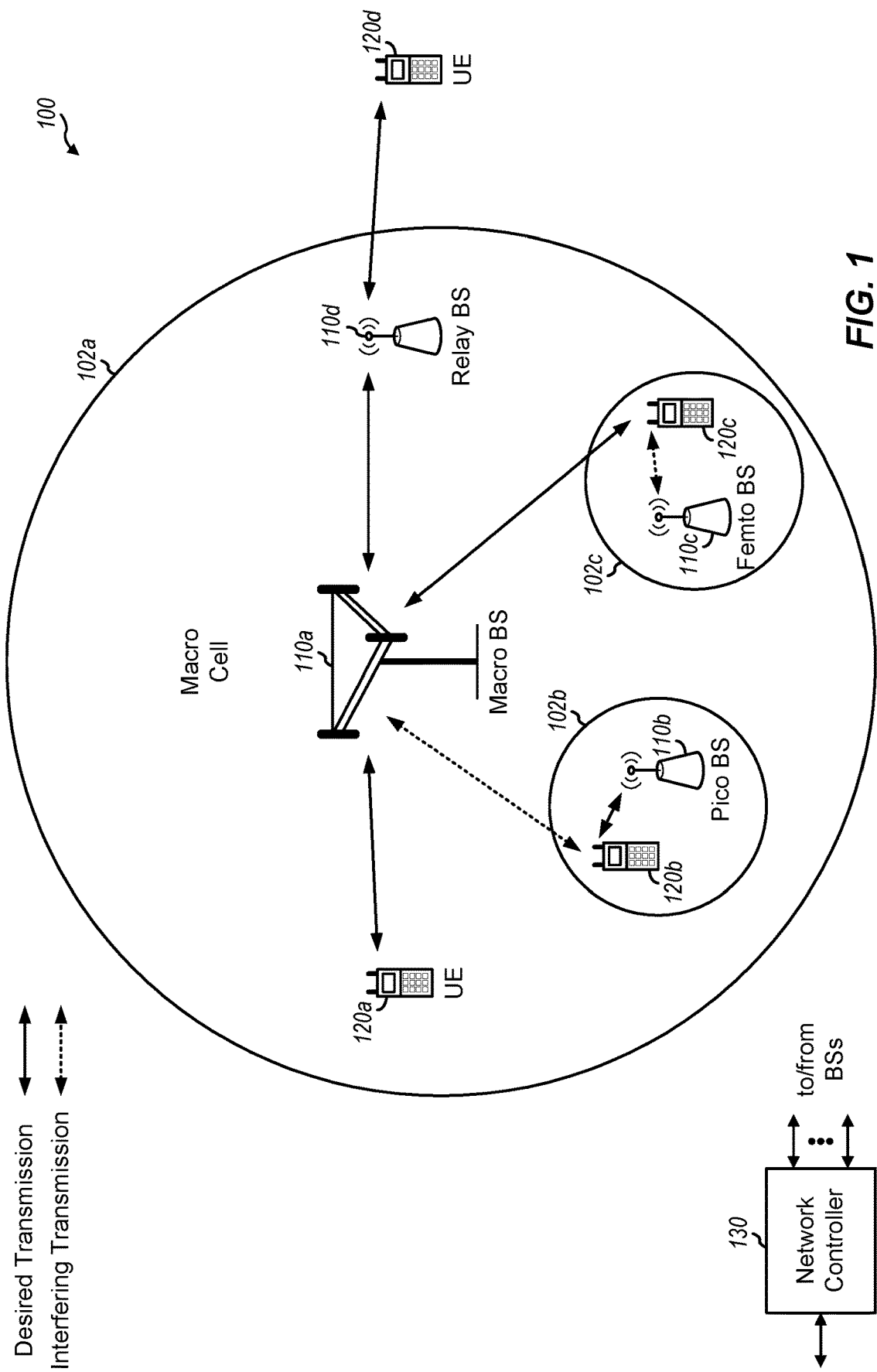
FIG. 1 is a block diagram conceptually illustrating an example of a wireless communication network, in accordance with certain aspects of the present disclosure.

As will be described in more detail below, a user equipment (UE) may support various UE-categories (e.g., long term evolution (LTE) UE-categories, 5G UE-categories, etc.). The different UE-categories may define uplink and downlink operating parameters for the UE. Some UE-categories may use less power than other UE-categories. It may be desirable for an idle mode UE to operate according to a UE-category that uses less power than a UE-category in the connected mode.

Aspects of the present disclosure provide techniques and apparatus for dynamic UE-Category switching for enhanced idle mode power savings. For example, if the cell supports a lower UE-category, such Cat-M1, the UE may dynamically switch to the lower UE-category when the UE moves to the idle mode or after the UE is in the idle mode for a duration. In some cases, the UE may initiate an out-of-service procedure and then re-register as the lower UE-category. Alternatively, during an initial attach procedure to the cell, the UE may register as both the higher and lower UE-category.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspect. Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Node B (NB), gNB, 5G NB, NR BS, Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some implementations, an access terminal may comprise a cellular telephone, a smart phone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Additional examples of access terminals include a computer (e.g., a desktop), a portable communication device, a portable computing device (e.g., a laptop, a personal data assistant, a tablet, a netbook, a smartbook, an ultrabook), wearable device (e.g., smart watch, smart glasses, virtual reality goggles, smart bracelet, smart wristband, smart belt, smart ring, smart jewelry, smart clothing, etc.), medical devices or equipment, healthcare device, biometric sensors/devices, an entertainment device (e.g., music device, video device, satellite radio, gaming device, etc.), a camera, a vehicular component or sensor, smart meters/sensors, industrial manufacturing equipment, a positioning device (e.g., GPS, Beidou, etc.), a drone, a robot/robotic device, or any other suitable device that is configured to communicate via a wireless or wired medium. In some aspects, a node is a wireless node. A wireless node may provide, for example, connectivity for or to a network (e.g., a wide area network such as the Internet or a cellular network) via a wired or wireless communication link. Some UEs may be considered machine-type communication (MTC) or enhanced MTC (eMTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as narrowband Internet-of-Things (NB-IoT) devices.

It is noted that while aspects may be described herein using terminology commonly associated with 3G and/or 4G wireless technologies, aspects of the present disclosure can be applied in other generation-based communication systems, such as 5G and later, including new radio (NR) technologies.

An Example Wireless Communication System

FIG. 1 is a diagram illustrating an architecture for a wireless communication network 100 in which aspects of the present disclosure may be practiced. For example, the UE 120 may operate according to a first UE category (e.g., regular UE CAT) in the idle mode. The UE 120 may determine that the cell (e.g., BS 110) supports a second UE category (e.g., UE CAT M1) lower than the first UE category. The UE 120 may take action to operate in the cell according to the second UE category.

Wireless communication network 100 may be an LTE network or some other wireless network, such as a 5G or new radio (NR) network. Wireless communication network 100 may include a number of BSs 110 and other network entities. ABS is an entity that communicates with user equipments (UEs) and may also be referred to as a NR BS, a Node B (NB), a gNB, a 5G NB, an access point (AP), a transmit receive point (TRP), etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. ABS for a femto cell may be referred to as a femto BS or a home BS. In the example shown in FIG. 1, a BS 110*a* may be a macro BS for a macro cell 102*a*, an BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", "wireless node", and "cell" may be used interchangeably herein.

In some examples, a cell may not necessarily be stationary, and the geographic area of the cell may move according to the location of a mobile base station. In some examples, the base stations may be interconnected to one another and/or to one or more other base stations or network nodes (not shown) in the access network 100 through various types of backhaul interfaces such as a direct physical connection, a virtual network, or the like using any suitable transport network.

Wireless communication network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, etc.

Wireless communication network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless communication network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
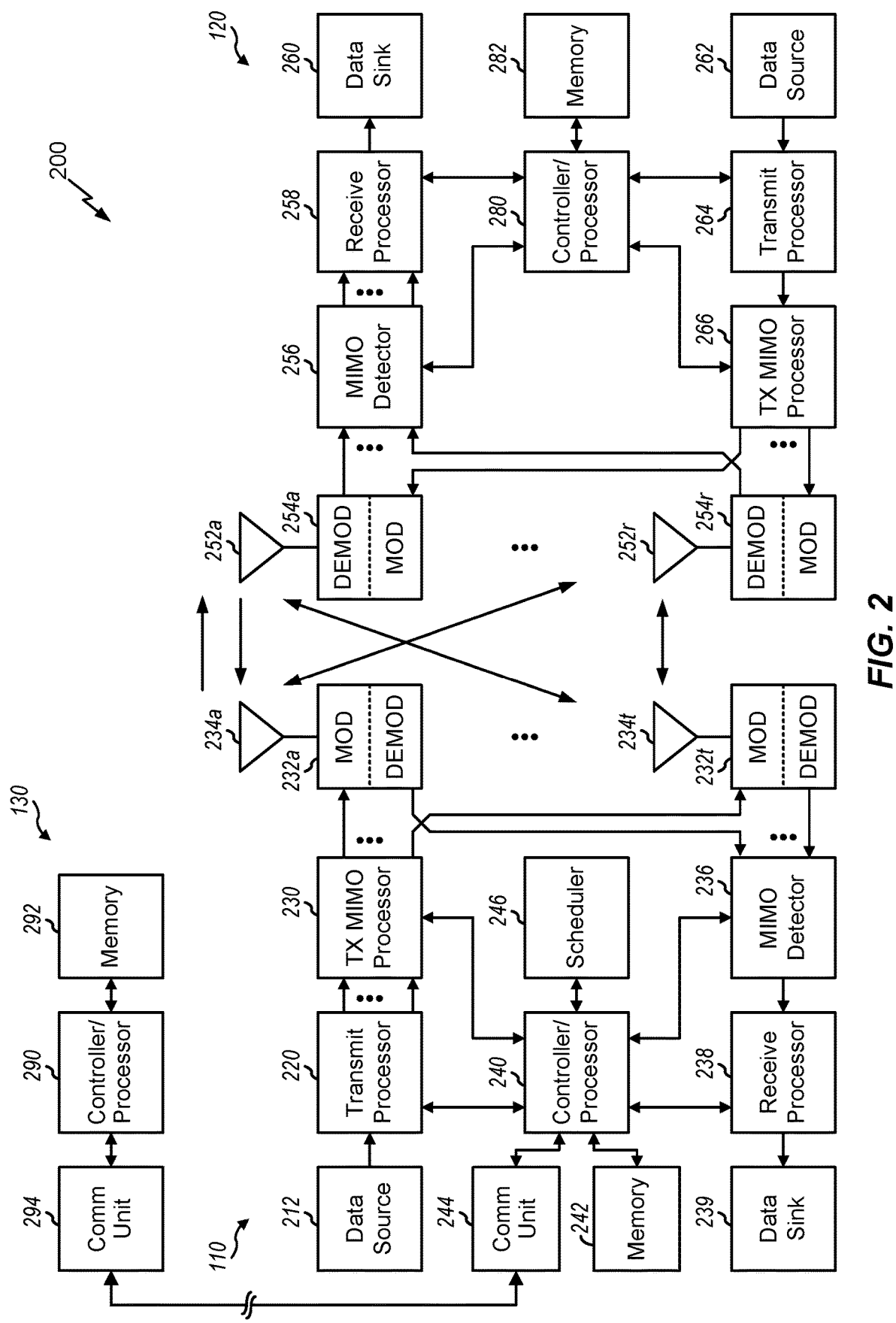
FIG. 2 shows a block diagram conceptually illustrating an example of a base station in communication with a user equipment (UE) in a wireless communications network, in accordance with certain aspects of the present disclosure.

FIG. 2 shows a block diagram of a design of BS 110 and UE 120, which may be one of the BSs and one of the UEs in FIG. 1. BS 110 may be equipped with T antennas 234*a* through 234*t*, and UE 120 may be equipped with R antennas 252*a* through 252*r*, where in general T>1 and R>1.

At BS 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to certain aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively, to perform techniques presented herein for MSI decoding using an offline or online mode. For example, processor 280 and/or other processors and modules at UE 120, may perform or direct operations of UE 120 to perform techniques presented herein for dynamic switching of UE-Category. For example, controller/processor 280 and/or other controllers/processors and modules at UE 120 may perform or direct operations 900 shown in FIG. 9. For example, controller/processor 240 and/or other controllers/processors and modules at base station 110 may perform or direct operations 1000 shown in FIG. 10. Memories 242 and 282 may store data and program codes for base station 110 and UE 120, respectively. A scheduler 246 may schedule UEs for data transmission on the downlink and/or uplink.

Figure 3:
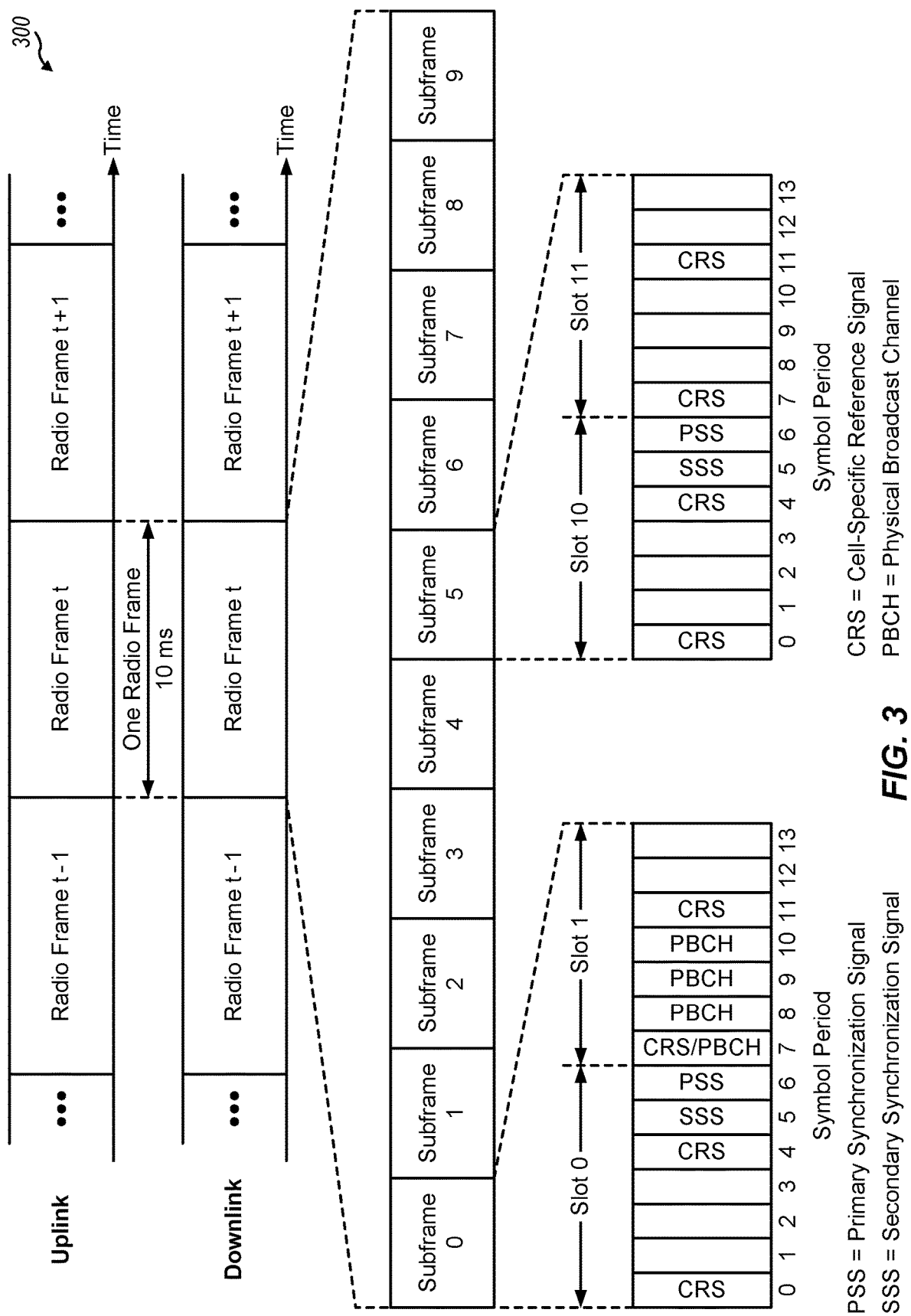
FIG. 3 is a block diagram conceptually illustrating an example of a frame structure in a wireless communications network, in accordance with certain aspects of the present disclosure.

FIG. 3 shows an exemplary frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L–1.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), the BS may transmit these or other signals in these locations or in different locations of the subframe.

Figure 4:
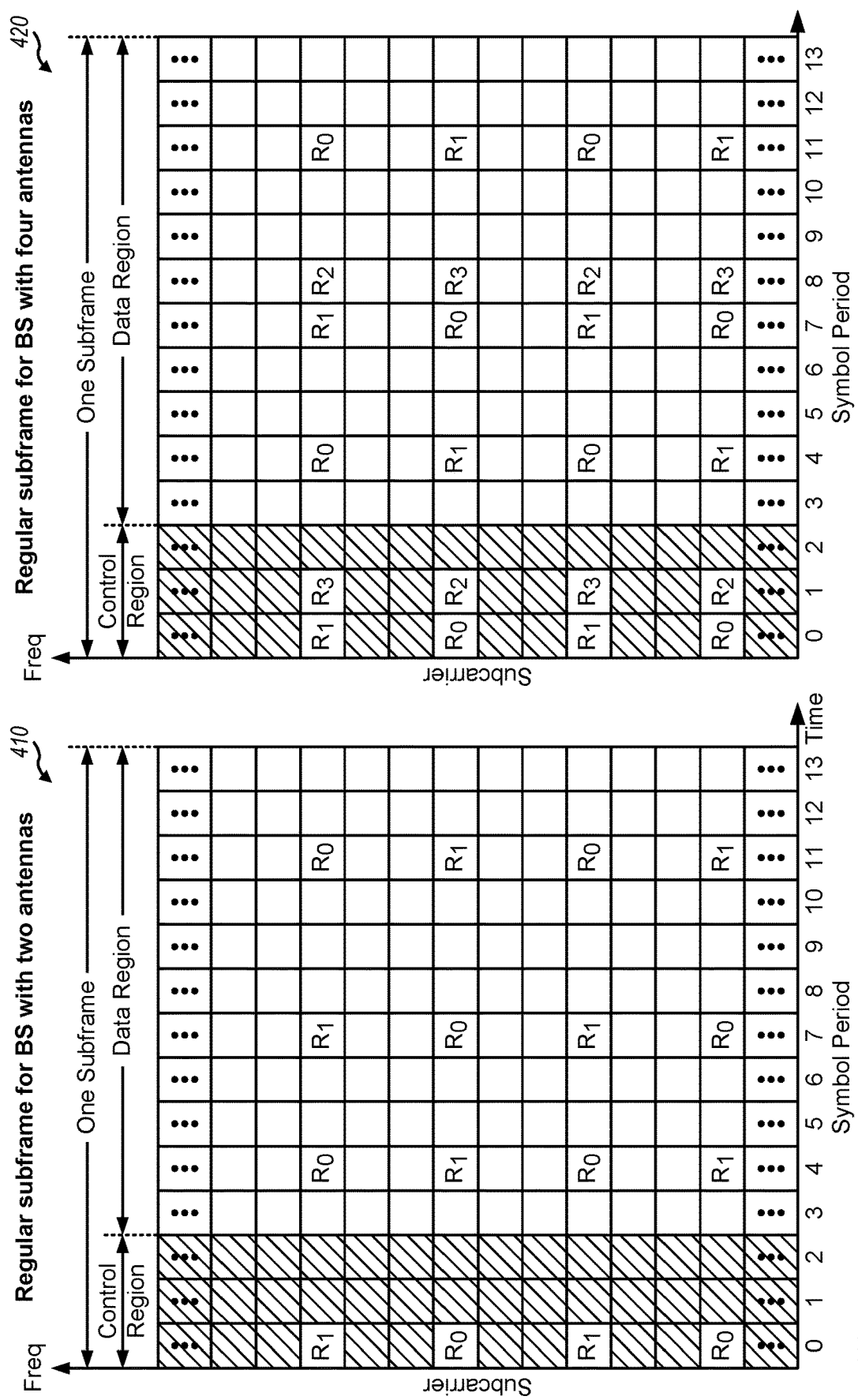
FIG. 4 is a block diagram conceptually illustrating two exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks (RBs). Each RB may cover 12 subcarriers in one slot and may include a number of resource elements (REs). Each RE may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal (RS) is a signal that is known a priori by a transmitter and a receiver and may also be referred to as pilot. A CRS is a RS that is specific for a cell, e.g., generated based on a cell identity (ID). In FIG. 4, for a given RE with label Ra, a modulation symbol may be transmitted on that RE from antenna a, and no modulation symbols may be transmitted on that RE from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, REs not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q–1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

Example NR/5G RAN Architecture

While aspects of the examples described herein may be associated with LTE technologies, aspects of the present disclosure may be applicable with other wireless communications systems, such as new radio (NR) or 5G technologies.

NR may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover.

Figure 5:
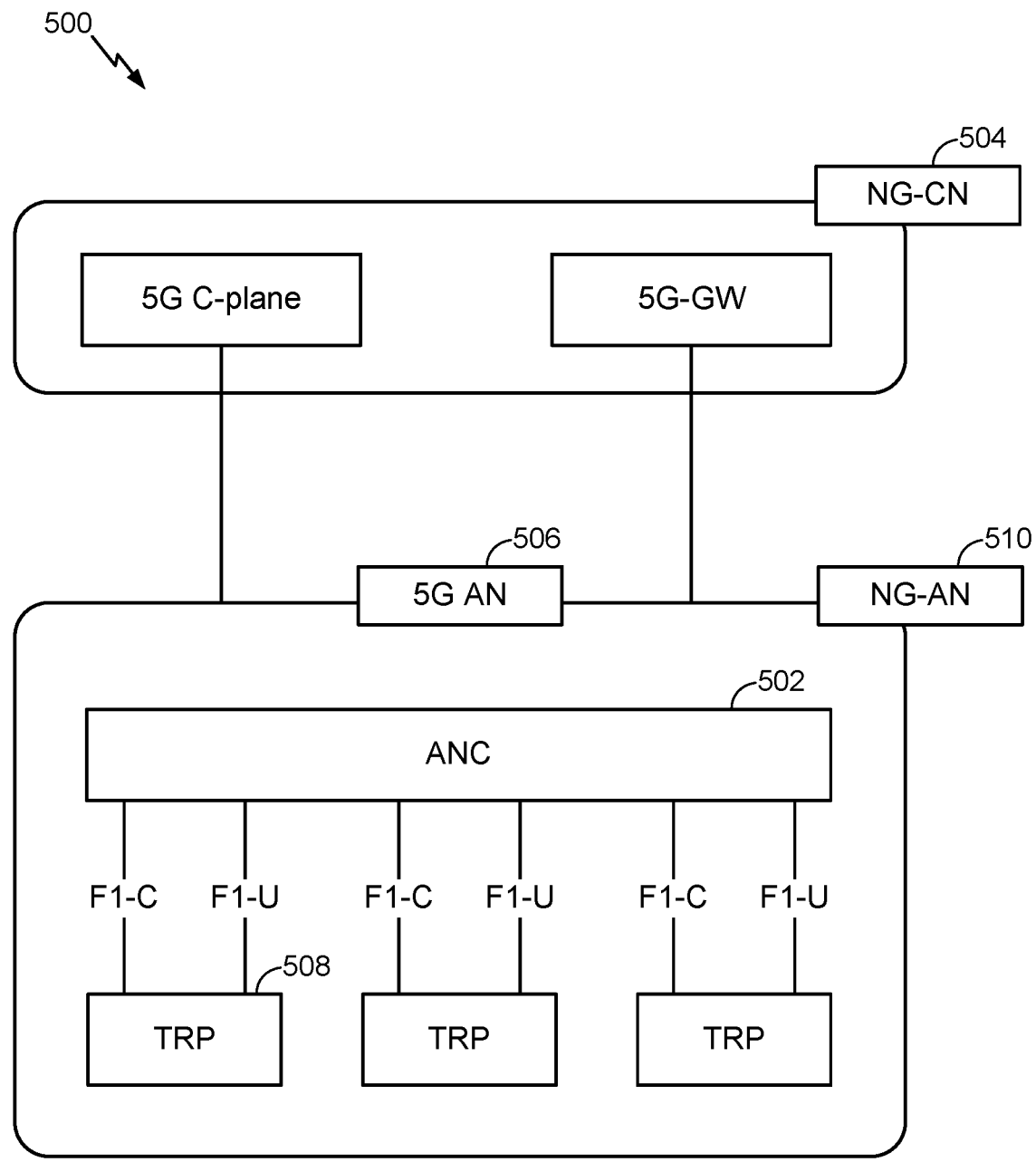
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE. According to certain aspects, a BS may include a central unit (CU) (e.g., ANC 502) and/or one or more distributed units (e.g., one or more TRPs 508).

The local architecture 500 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be pre-set within a TRP and/or across TRPs via the ANC 502. According to aspects, no inter-TRP interface may be needed/present.

According to aspects, a dynamic configuration of split logical functions may be present within the architecture 500. The PDCP, RLC, MAC protocol may be adaptively placed at the ANC or TRP.

Figure 6:
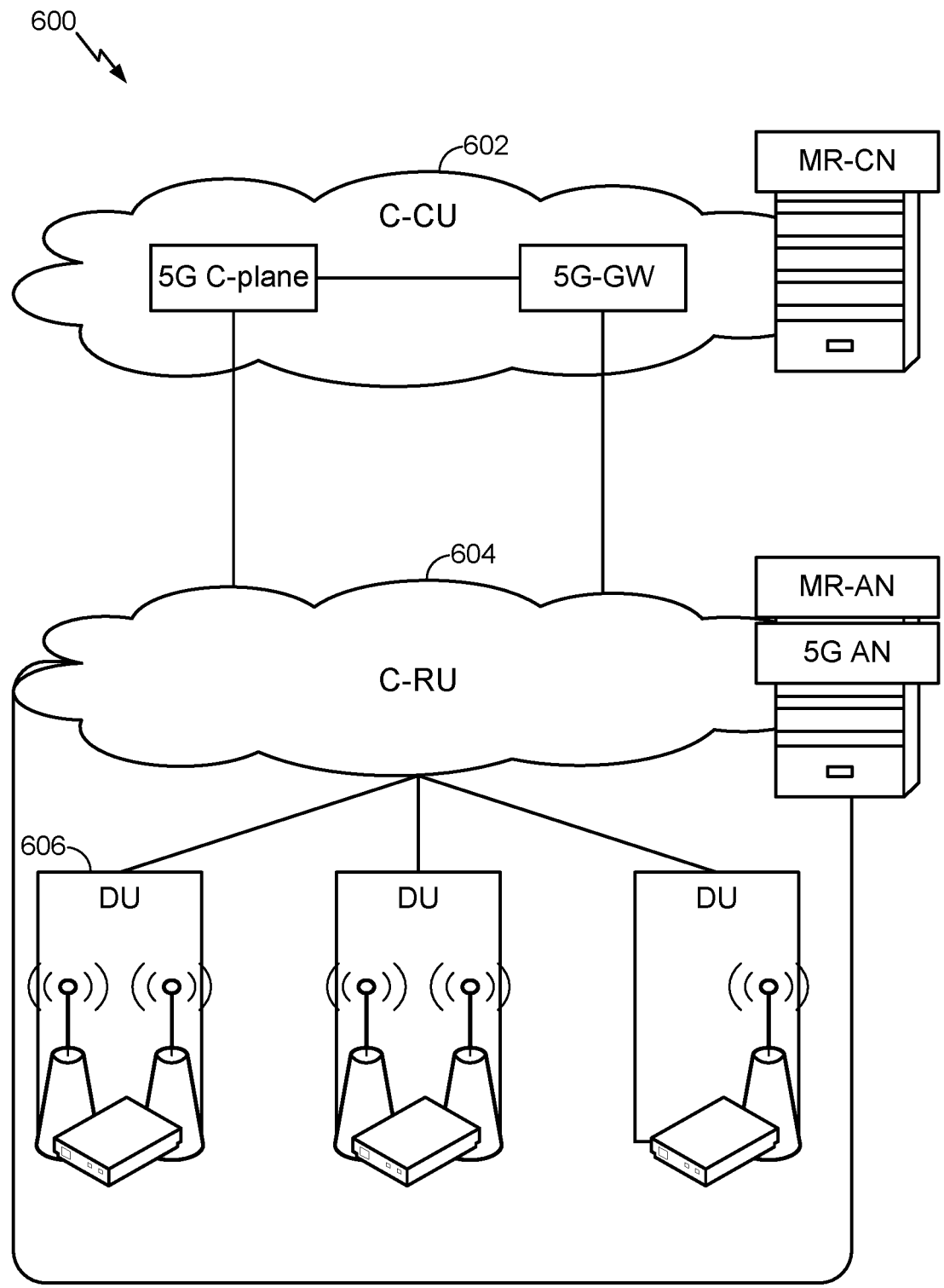
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

Figure 7:
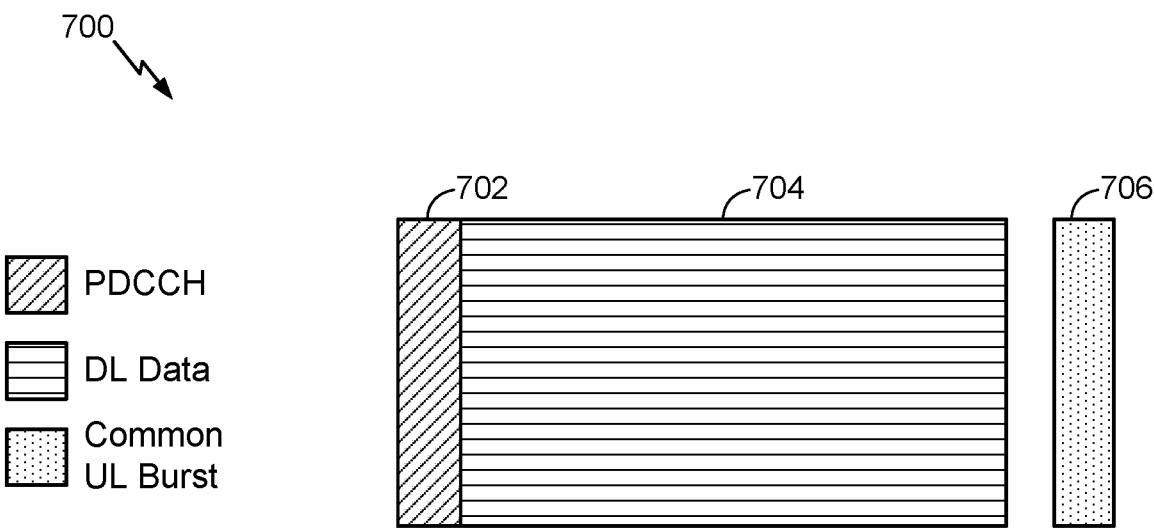
FIG. 7 is a diagram illustrating an example of a downlink (DL)-centric subframe, in accordance with certain aspects of the present disclosure.

FIG. 7 is a diagram 700 showing an example of a DL-centric subframe. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include a common UL portion 706. The common UL portion 706 may sometimes be referred to as an UL burst, a common UL burst, and/or various other suitable terms. The common UL portion 706 may include feedback information corresponding to various other portions of the DL-centric subframe. For example, the common UL portion 706 may include feedback information corresponding to the control portion 702. Non-limiting examples of feedback information may include an ACK signal, a NACK signal, a HARQ indicator, and/or various other suitable types of information. The common UL portion 706 may include additional or alternative information, such as information pertaining to random access channel (RACH) procedures, scheduling requests (SRs), and various other suitable types of information. As illustrated in FIG. 7, the end of the DL data portion 704 may be separated in time from the beginning of the common UL portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 8:
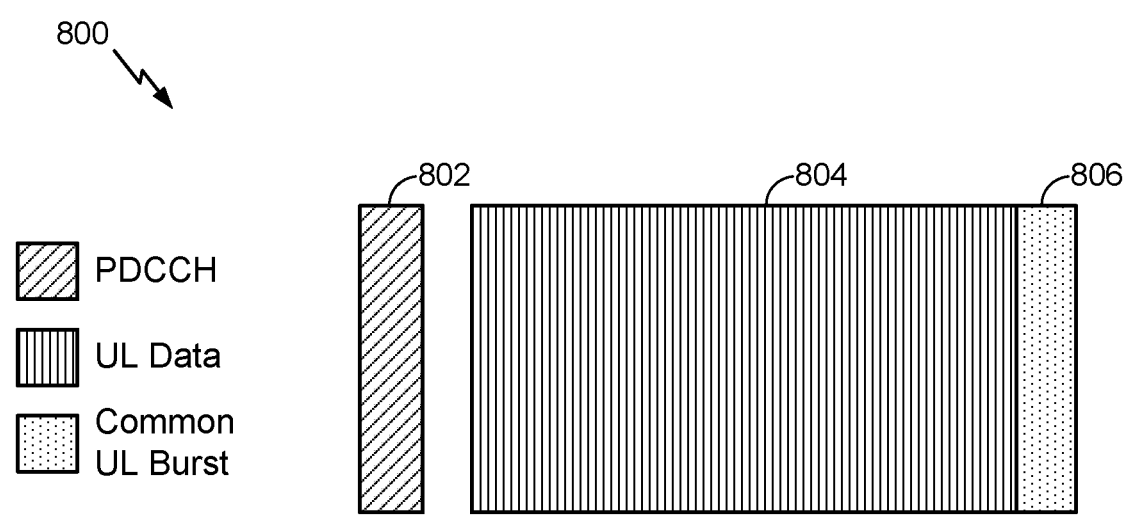
FIG. 8 is a diagram illustrating an example of an uplink (UL)-centric subframe, in accordance with certain aspects of the present disclosure.

FIG. 8 is a diagram 800 showing an example of an UL-centric subframe. The UL-centric subframe may include a control portion 802. The control portion 802 may exist in the initial or beginning portion of the UL-centric subframe. The control portion 802 in FIG. 8 may be similar to the control portion 802 described above with reference to FIG. 8. The UL-centric subframe may also include an UL data portion 804. The UL data portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical downlink control channel (PDCCH).

As illustrated in FIG. 8, the end of the control portion 802 may be separated in time from the beginning of the UL data portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 806. The common UL portion 806 in FIG. 8 may be similar to the common UL portion 706 described above with reference to FIG. 7. The common UL portion 806 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a frame may include both UL centric subframes and DL centric subframes. In this example, the ratio of UL centric subframes to DL subframes in a frame may be dynamically adjusted based on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased.

Example Methods and Apparatus for Dynamic UE-Category Switching for Enhanced Idle Mode Power Savings A user equipment (UE) or a modem may perform idle mode activities. The UE or modem may be an Internet-of-Things (IoT) device, a narrowband IoT (NB-IoT), or other wireless communications device. The device may communication using long term evolution (LTE) as the access stratum or according to different access stratum, for example, such as new radio (NR) or 5G. The idle mode activities performed by the device may be mandated by a wireless communication standard (e.g., such as the IEEE LTE standards). The idle mode activities may be different based on the UE-Category (CAT) of the device, or the UE Category of which the device is registered with the network.

The UE Category may define uplink and downlink capability of the UE. In one example, the capabilities associated with the UE Category may be as defined in TS 36.306 of the 3GPP wireless standards (e.g., Table 4.1-1 for downlink and Table 4.1-2 for the uplink). Other UE Categories may be defined by different wireless standards. For example, LTE Release-12 introduces Cat 0 which may be used for IoT, NB-IoT and/or enhanced machine type communication (eMTC) devices. As another example, LTE Release-13 introduces UE Cat-M1. UE Cat-M1 may have a DL peak rate 1 Mbps, and uplink peak rate 1 Mbps, may operate according to half duplex (HD) or full duplex (FD), may use 1.4 MHz bandwidth, and a maximum transmit power of 20 dBm or 23 dBm. These UE categories are merely exemplary, other UE categories may be defined, and the techniques of this disclosure may be applied for wireless device operating according to and/or supporting various different UE categories (e.g., LTE-M, EC-GSM-IoT (enhanced or extended coverage GSM IoT), LPWA (low power wide area), etc.).

In some cases, activities (operations) performed according to low UE categories may use less power than activities performed according to higher UE categories. Idle mode activities may drain power, even for lower UE categories (e.g., CAT 1) mobile devices.

Accordingly, techniques and apparatus for reducing power consumed by idle mode UEs are desirable—while still remaining compliant to the 3GPP specifications.

Aspects of the present disclosure relate to methods and apparatus for dynamic UE-Category switching for enhanced idle mode power savings. For example, UEs moving to the idle mode may switch to (e.g., drop down to) a lower UE-Category (e.g., such Cat-M1), while UEs moving to the connected mode may switch to a higher UE-Category (e.g., referred to as a regular UE Category, for example, which may include UE categories 1 and higher defined in the wireless standards).

In some cases, enhanced discontinuous reception (eDRX) and/or power saving mode (PSM) can be used by UEs that support lower UE-categories. eDRX and PSM are features that enable very long battery lifetimes, such as 10 years or more. eDRX may include use of extended DRX cycles that provide UEs with longer sleeping periods between reading paging or control channels. In PSI, the UE can save power when there is no frequent need to communicate with the device.

Figure 9:
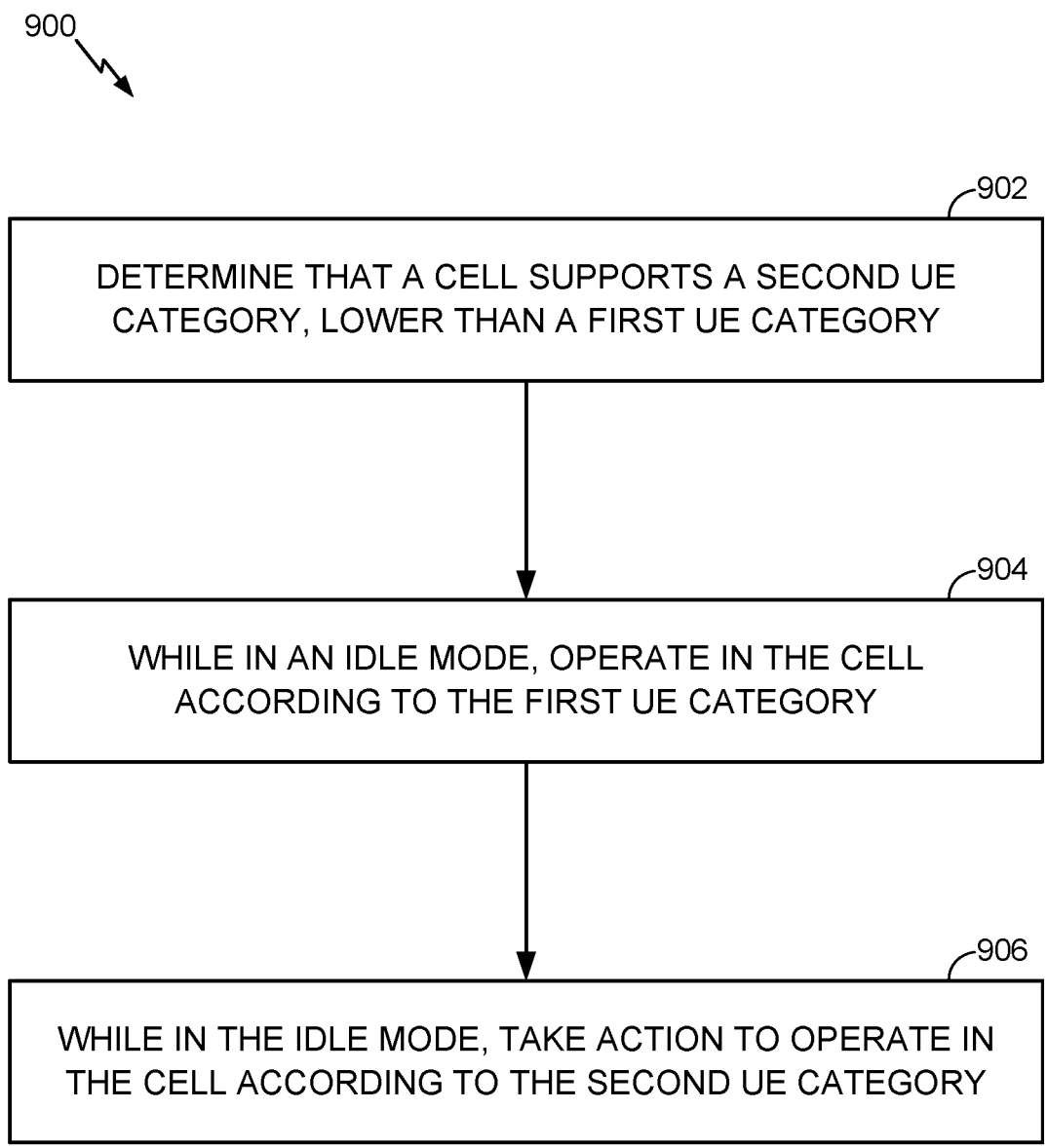
FIG. 9 is a flow diagram illustrating operations performed by a UE for dynamically switching UE-Category, in accordance with certain aspects of the present disclosure.

FIG. 9 is a flow diagram illustrating operations 900 that may be performed, for example, by a UE (e.g., UE 120, which may be an MTC or eMTC device, IoT device, NB-IoT device, or other low cost device) for dynamic switching of the UE-Category, in accordance with certain aspects of the present disclosure. The operations 900 may begin, at 902, the UE determines (e.g., by monitoring broadcast information from the cell) that a cell supports a second UE category (e.g., Cat-M1), lower than a first UE category. At 904, while in an idle mode (e.g., after a threshold duration in the idle mode), the UE operates in the cell according to the first UE category (e.g., a regular UE-Category, such Cat 1 or higher). At 906, while in the idle mode, the UE takes action to operate in the cell according to the second UE category.

As described in more detail below, the UE may initiate a switch and then register with the cell as the second UE category. For example, the UE may perform an out-of-service (OOS) procedure with the cell and register with the cell as the second UE category. Alternatively, the UE may register with the cell, during an initial attach, as both the first UE category and the second UE category. The UE may dynamically provide an indication of a currently selected UE category. The UE can then register as the first UE category while entering the connected mode (e.g., while attempting to connect to the cell which may occur after receiving paging from the cell) or as the second UE category when moving to the idle mode.

Figure 10:
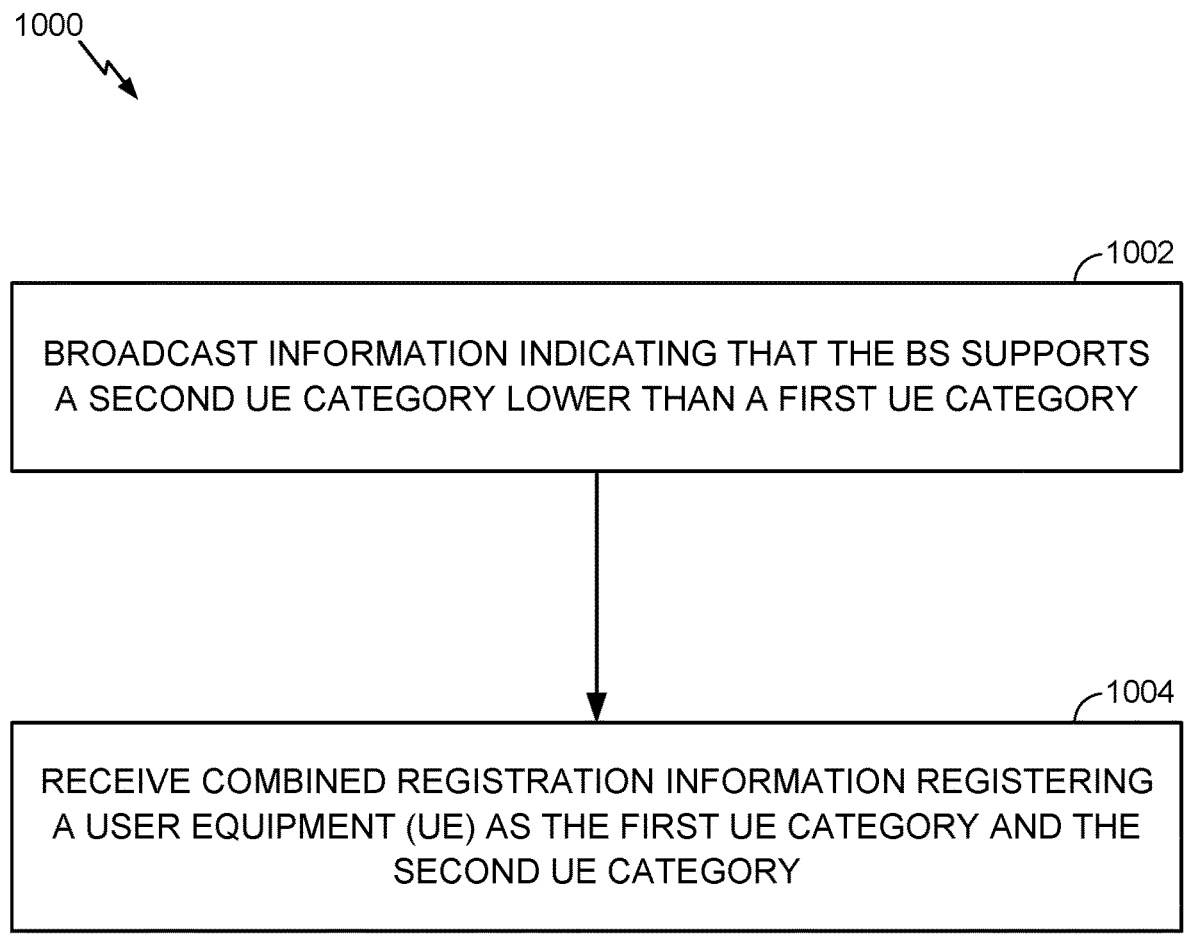
FIG. 10 is a flow diagram illustrating operations performed by a BS for dynamically switching UE-Category, in accordance with certain aspects of the present disclosure.

FIG. 10 is a flow diagram illustrating operations 1000 that may be performed, for example, by a BS (e.g., BS 110) for dynamic switching of UE-category, in accordance with certain aspects of the present disclosure. The operations 1000 may begin, at 1002, by broadcasting information indicating that the BS supports a second UE category (e.g., UE Cat-M1), lower than a first UE category. At 1004, the BS receives combined registration information registering a UE as the first UE category and the second UE category. The BS may receive the combined registration information during an initial attachment procedure. The BS may receive an indication of a currently selected UE category. The indication may be provided dynamically by the UE. For example, the BS may receive registration information registering the UE as the first UE category along with a connection setup message from the UE and/or the BS may receive registration information registering the UE as the second UE category when the UE moves to the idle mode.

Example Dynamic UE-Category Switching and Re-registration

According to certain aspects, the UE may perform dynamic switching and re-registering with the cell as a different UE-Category.

Figure 11:
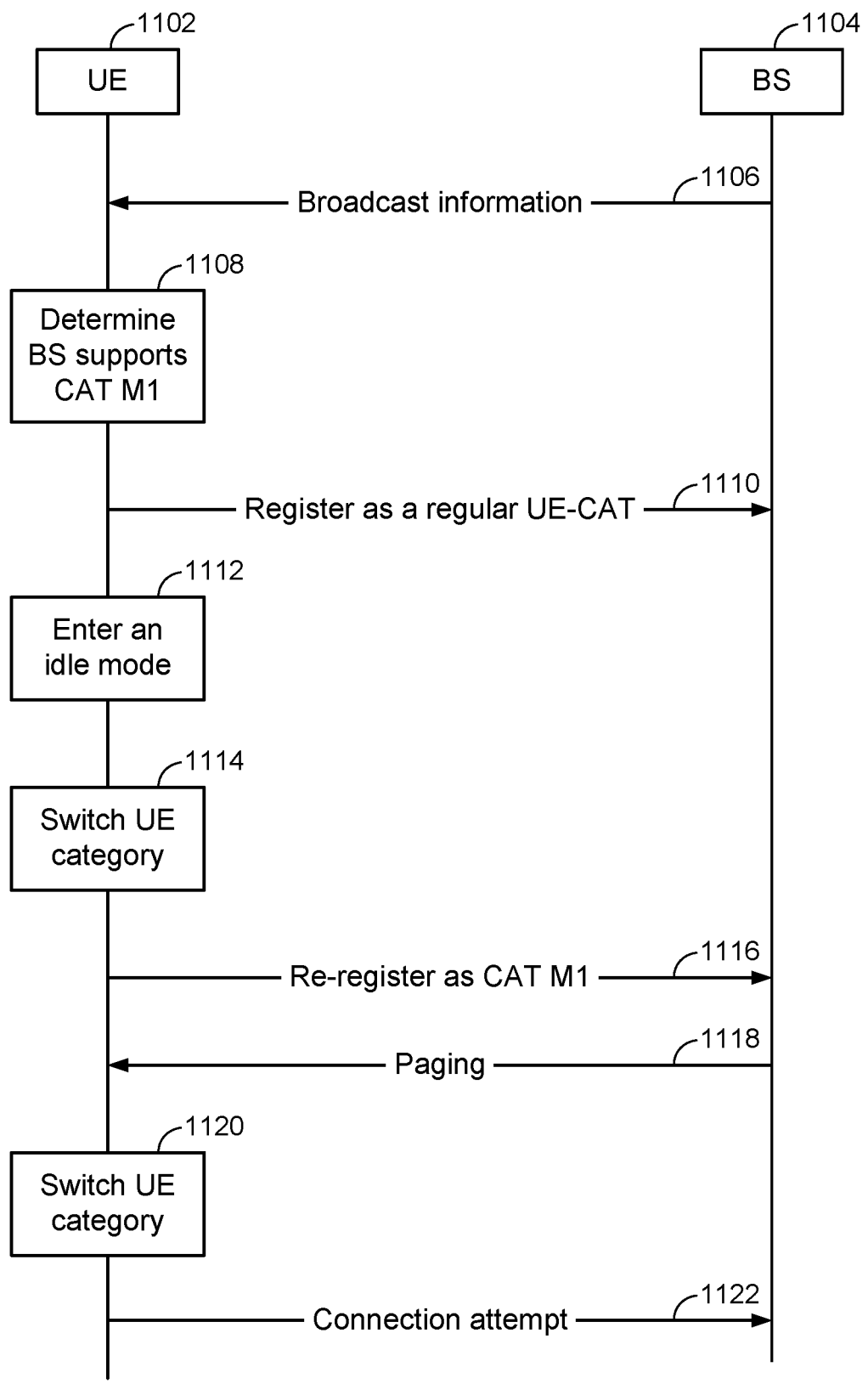
FIG. 11 is a call flow diagram for dynamically switching UE-Category, in accordance with certain aspects of the present disclosure.

FIG. 11 is a call flow diagram 1100 for dynamically switching UE-Category, in accordance with certain aspects of the present disclosure. In aspects, the UE 1102 may support a low UE-category, such as Cat-M1 mode of operation. The UE 1102 may operate according to a first UE-Category, which may be a regular UE-CAT (e.g., CAT 1 or beyond). For example, at 1110, the UE 1102 may register with BS 1104 as the regular UE-CAT.

At 1106, the UE may receive broadcast information from the BS 1104 and, at 1108, determine that the BS 1104 supports the low UE-category (e.g., CAT-M1) based on the broadcast information. For example, UE 1102 may monitor the network for broadcast information (e.g., monitor the physical broadcast channel (PBCH)). At 1106, the UE 1102 may receive the broadcast information (e.g., master information block (MIB) and system information blocks (SIBs)) from the BS 1104. Based on the broadcast information, the UE 1102 may determine, at 1108, that the BS 1104 supports a lower UE-Category, such as Cat-M1. For example, the schedulingInfoSIB1-BR element in the MIB may indicate that the cell supports Cat-M1.

Although shown in FIG. 11 before registering as the UE-CAT at 1100, the receipt of the broadcast information and the determination at steps 1106 and 1108 could occur at other times, such as after the registration at 1110 or after the UE enters the idle mode at 1112.

At 1112, the UE may enter an idle mode. At 1114, the idle mode UE 1102 may dynamically switch to a lower UE-CAT in order to enhance power savings during the idle mode (e.g., based on the determination that the BS 1104 supports CAT M1). In some cases, the idle mode UE 1102 may wait for a pre-configured duration (e.g., a threshold duration) in the idle mode before switching. For example, although not shown in FIG. 11, the UE could initiate a timer upon entering the idle mode and switch the UE category at expiry of the timer.

According to certain aspects, if the network (e.g., cell, BS 1104) supports the lower UE-category, such as Cat-M1 mode of operation, at 1114, the UE 1102 may switch UE category and, at 1116, re-register as the lower UE-Category with the network. Based on the registration for the lower UE-category, the network may know that the UE pages are to be repeated and the paging cycle extended (e.g., using eDRX).

When the UE 1102 receives, at 1118, a page from BS 1104 that is directed to the UE (e.g., such as a mobile terminated (MT) call) or when the UE 1102 initiates a call (e.g., a mobile originated (MO) call), the UE 1102 may again switch UE category at 1120 (e.g., back to the original regular UE category or a different UE category). For example, at 1122, the UE 1102 may re-register to the network as the higher UE-Category and then move to the connected state (e.g., during the call setup).

Operating according to the lower UE-category, such as Cat-M1, may result in large idle mode power savings for the UE.

Example Dynamic UE-Category Switching Using Multiple UE-Category Registration

According to certain aspects, the UE may be register with multiple UE-categories (e.g., a regular UE-CAT and Cat-M1) to enable dynamic UE-category switching.

Figure 12:
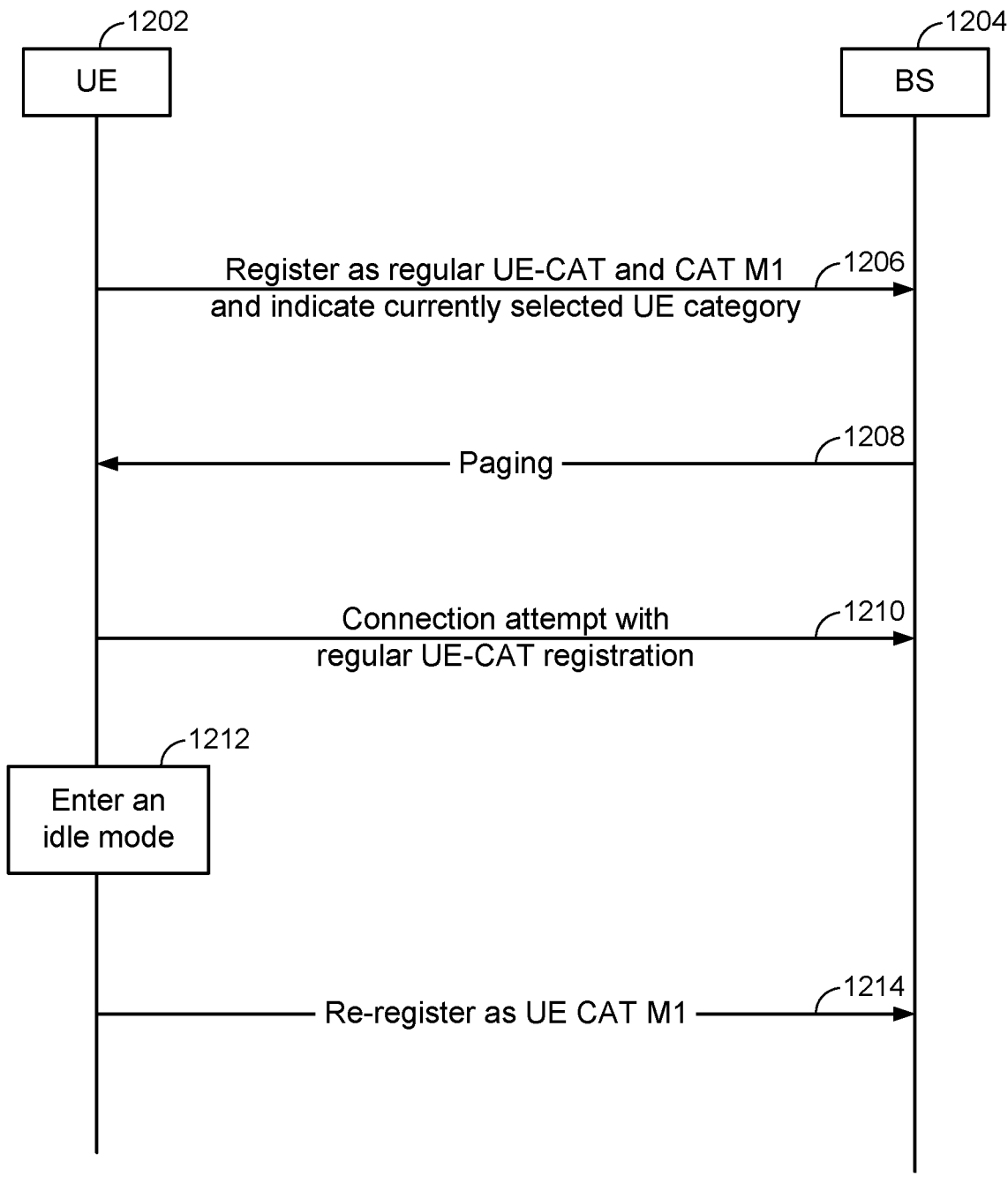
FIG. 12 is another call flow diagram for dynamically switching UE-Category, in accordance with certain aspects of the present disclosure.

FIG. 12 is a call flow diagram 1200 for dynamically switching UE-Category, in accordance with certain aspects of the present disclosure. As shown in FIG. 12, at 1206, the UE 1202 can register with the BS 1204 as multiple UE-categories. For example, during an initial attachment procedure with the cell, the UE 1202 may send combined registration information registering the UE 1202 as a regular CAT (e.g., CAT 1 or higher) and low UE category, such as Cat-M1. Along with the combined registration information, at 1206, UE 1202 may also indicate the chosen category to be used henceforth (e.g., the currently selected UE category). After the combined registration, the UE 1202 can dynamically switch between the registered UE-categories. For example, at 1208, the UE 1202 may receive paging from the BS 1204 and, at 1210 attempt to connect to the network and move to the connected state. During the connection attempt at 1210, the UE 1202 may register as the regular UE-category, for example by sending a new message (e.g., an indication or registration information) to the network. For example, the new message may be sent along with a connection setup message at 1210. While moving back from the connected state to the idle mode (or after entering the idle mode, e.g., shortly after entering the idle mode) at 1212, the UE may register itself as the Cat-M1 at 1214.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. As used herein, reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for determining, means for performing, means for operating, means for transmitting, means for receiving, means for sending, means for signaling, means for selecting, means for determining, means for identifying, means for registering, means for attempting, means for broadcasting, means for initiating, means for taking action, and/or means for monitoring may include one or more processors or other elements, such as the transmit processor 264, the controller/processor 280, the receive processor 258, and/or antenna(s) 252 of the user equipment 120 illustrated in FIG. 2, and/or the transmit processor 220, the controller/processor 240, and/or antenna(s) 234 of the base station 110 illustrated in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. For example, in the case of a wireless node, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors.

Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a wireless node and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless node and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   registering with a cell as at least a first UE category associated with a first supported throughput and a first supported number of layers;
   operating in the cell according to the first UE category when the UE is in a connected mode;
   determining that the UE is in an idle mode for a threshold duration;
   determining that the cell supports a second UE category, lower than the first UE category, associated with a second supported throughput and a second supported number of layers; and
   while in the idle mode, operating in the cell according to the second UE category based on the determination that the cell supports the second UE category, wherein the operating in the cell according to the second UE category is performed based on the determination that the UE is in the idle mode for the threshold duration.

2. The method of claim 1, wherein determining that the cell supports the second UE category comprises:
   monitoring for broadcast information from the cell; and
   determining the cell supports the second UE category based on the broadcast information.

3. The method of claim 1, further comprising:
initiating an out-of-service procedure with the cell; and
registering with the cell as the second UE category.

4. The method of claim 1, wherein the second UE category comprises a UE category (CAT) M1.

5. The method of claim 1, further comprising, while in the idle mode:
receiving a page from the cell; and
in response to receiving the page:
re-registering with the cell as the first UE category; and
attempting to connect to the cell and operate in the cell according to the first UE category.

6. The method of claim 1, wherein:
registering with the cell as at least the first UE category comprises registering with the cell as the first UE category and the second UE category during an initial attachment procedure with the cell; and
the method further comprises, during the initial attachment procedure, indicating the first UE category as a currently selected UE category.

7. The method of claim 6, further comprising:
entering the idle mode; and
indicating the second UE category to the cell as the currently selected UE category.

8. An apparatus for wireless communications by a user equipment (UE), comprising:
means for registering with a cell as at least a first UE category associated with a first supported throughput and a first supported number of layers;
means for operating in the cell according to the first UE category when the UE is in a connected mode;
means for determining that the apparatus is in an idle mode for a threshold duration;
means for determining that the cell supports a second UE category, lower than the first UE category, associated with a second supported throughput and a second supported number of layers; and
means for, while in the idle mode, operating in the cell according to the second UE category based on the determination that the cell supports the second UE category, wherein the operating in the cell according to the second UE category is performed based on the determination that the apparatus is in the idle mode for the threshold duration.

9. The apparatus of claim 8, wherein means for determining that the cell supports the second UE category comprises:
means for monitoring for broadcast information from the cell; and
means for determining the cell supports the second UE category based on the broadcast information.

10. The apparatus of claim 8, further comprising:
means for initiating an out-of-service procedure with the cell; and
means for registering with the cell as the second UE category.

11. The apparatus of claim 8, wherein the second UE category comprises a UE category (CAT) M1.

12. The apparatus of claim 8, further comprising:
means for receiving a page from the cell while in the idle mode; and
means for, while in the idle mode, in response to receiving the page:
re-registering with the cell as the first UE category; and
attempting to connect to the cell.

13. The apparatus of claim 8, wherein:
means for registering with the cell as at least the first UE category comprises means for registering with the cell as the first UE category and the second UE category during an initial attachment procedure with the cell; and
the apparatus further comprises means for indicating the first UE category as a currently selected UE category during the initial attachment procedure.

14. The apparatus of claim 13, further comprising:
means for entering the idle mode; and
means for indicating the second UE category to the cell as the currently selected UE category.

15. An apparatus for wireless communications by a user equipment (UE), comprising:
at least one processor; and
a memory coupled to the at least one processor, the memory comprising code executable by the at least one processor to cause the apparatus to:
register with a cell as at least a first UE category associated with a first supported throughput and a first supported number of layers;
operate in the cell according to the first UE category when the UE is in a connected mode;
determine that the apparatus is in an idle mode for a threshold duration;
determine that the cell supports a second UE category, lower than the first UE category, associated with a second supported throughput and a second supported number of layers; and
while in the idle mode, operate in the cell according to the second UE category based on the determination that the cell supports the second UE category, wherein the operating in the cell according to the second UE category is performed based on the determination that the apparatus is in the idle mode for the threshold duration.

16. A non-transitory computer readable medium having computer executable code stored thereon for wireless communications by a user equipment (UE), comprising:
code for registering with a cell as at least a first UE category associated with a first supported throughput and a first supported number of layers;
code for operating in the cell according to the first UE category when the UE is in a connected mode;
code for determining that the UE is in an idle mode for a threshold duration;
code for determining that the cell supports a second UE category, lower than the first UE category, associated with a second supported throughput and a second supported number of layers; and
code for, while in the idle mode, operating in the cell according to the second UE category based on the determination that the cell supports the second UE category, wherein the operating in the cell according to the second UE category is performed based on the determination that the UE is in the idle mode for the threshold duration.

* * * * *